United States Patent [19]

Dreyfuss et al.

[11] Patent Number: 4,487,229

[45] Date of Patent: Dec. 11, 1984

[54] SYSTEM FOR PROTECTING MACHINE THREADS

[76] Inventors: Wilfried Dreyfuss, Dorfstrasse 52, D-3111 Eimke, Fed. Rep. of Germany; Thomas E. Remp, Jr., 5555 Del Monte Dr. T-2, Houston, Tex. 77056; Kurt Muller, Muhlenweg 58, 3101 Eicklingen, Fed. Rep. of Germany

[21] Appl. No.: 503,419

[22] Filed: Jun. 13, 1983

Related U.S. Application Data

[62] Division of Ser. No. 364,474, Mar. 31, 1982.

[51] Int. Cl.$^3$ ............................................. B65D 59/00
[52] U.S. Cl. .................................. 138/96 T; 220/279
[58] Field of Search ...................... 138/96 T; 220/279

[56] References Cited

U.S. PATENT DOCUMENTS

| | | | |
|---|---|---|---|
| 628,408 | 7/1899 | Loper | 138/96 T |
| 1,247,756 | 11/1917 | Wadsworth | 138/96 T |
| 1,758,613 | 5/1930 | Markle | 138/96 T |
| 2,212,423 | 8/1940 | Lytle | 138/96 T |
| 2,253,729 | 8/1941 | Schuetz | 138/96 T |
| 2,977,993 | 4/1961 | Scherer | 138/96 |
| 4,279,850 | 7/1981 | Lynch | 138/96 T |

FOREIGN PATENT DOCUMENTS

| | | | |
|---|---|---|---|
| 1125546 | 10/1956 | France | 138/96 T |
| 2294931 | 12/1974 | France | |
| 2391120 | 5/1977 | France | |
| 352540 | 7/1931 | United Kingdom | 138/96 T |

OTHER PUBLICATIONS

Article entitled "Grundlagen der Kunststoffverarbeitung", by W. Knappe, published by Carl Hanser Verlag Munchen, (1970), pp. 171-174.

Primary Examiner—John W. Shepperd
Attorney, Agent, or Firm—Allegretti, Newitt, Witcoff & McAndrews, Ltd.

[57] ABSTRACT

System for protecting machine parts, such as threads, from physical and chemical damage. The parts to be protected are cleaned, coated with a separating agent, and a mold is placed around them. A protective material is inserted in the interspace between the mold and pipe end. The protective material forms a tough, protective jacket. If desired, the mold can later be removed by means of a tear-open element or integrated weak spots. For the protection of pipe interiors, plastic material can be pressed into the end of the pipe such that it seals against the inside lining of the pipe.

11 Claims, 24 Drawing Figures

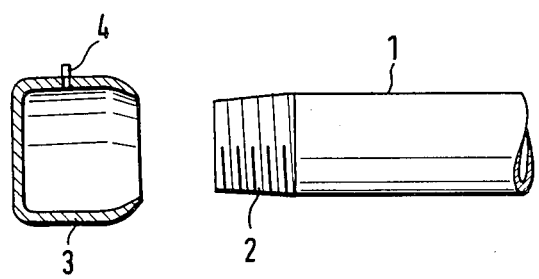
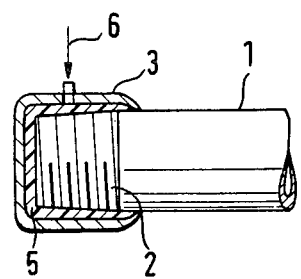
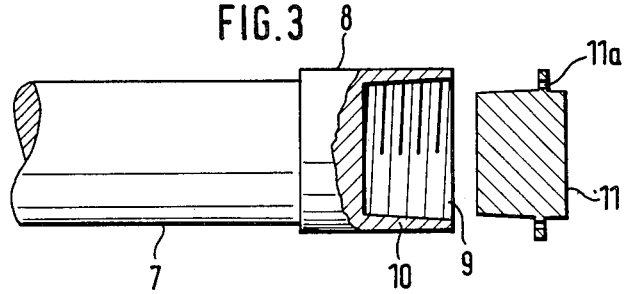
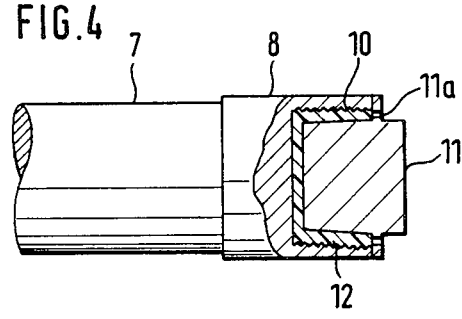
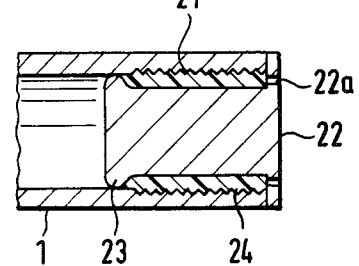

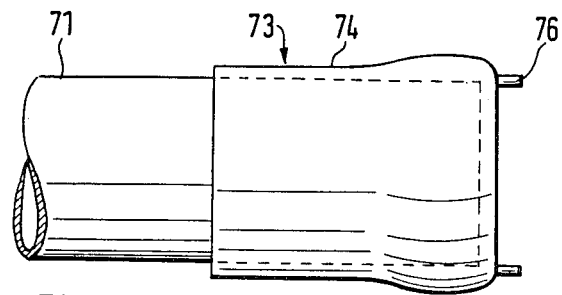
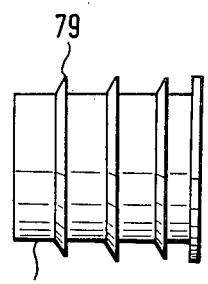
FIG. 17  FIG. 18
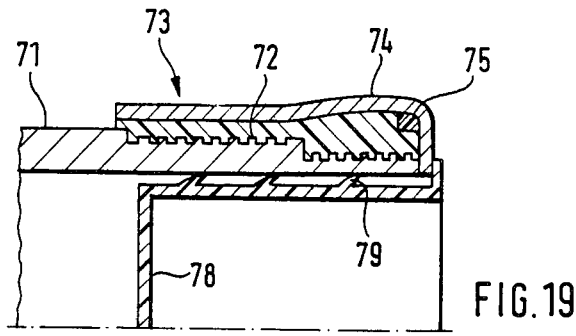
FIG. 19
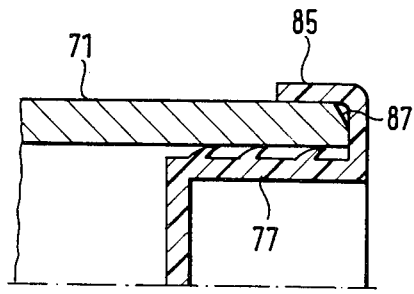
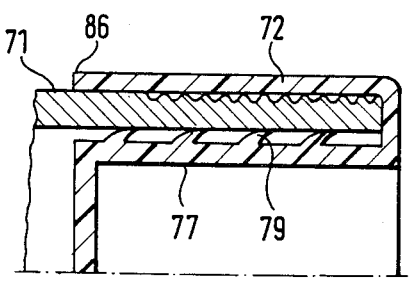
FIG. 20  FIG. 21

SYSTEM FOR PROTECTING MACHINE THREADS

This is a divisional of application Ser. No. 364,474, filed Mar. 31, 1982.

BACKGROUND OF THE INVENTION

The present invention relates generally to a system for protecting threads. More particularly, the invention relates to a system for protecting machine threads as well as methods for producing and attaching such protective devices to machine threads.

Threads are found, for exmple, on machine parts and pipes. Threads typically represent delicate areas that must be protected against harmful mechanical and chemical effects during their transportation and storage.

Consequently, it often becomes necessary to protect machine parts and pipes from damage by using protective caps and the like. When pipes are transported, for example, they are often subjected to very rough treatment. If pipes are to be used in a drilling operation, they are often first pulled up a drilling tower and, as a result, suffer damage. The actual threads, as well as the sealing flanges on the ends of the threads, are often damaged. Even a slightly damaged thread can render an expensive pipe unusable.

In addition to mechanical damage to pipes, the effect of the environment also can render pipes unusable. Salt water, sand, dust, as well as snow, rain, and wind have adverse effects on pipes. Corroded or rusted threads and sealing flanges render pipes unusable; repair of such chemically damaged pipes is expensive. Thus, it is imperative that threads and sealing flanges remain in good condition if the threads are to maintain good connections.

In conventional practice, threads have been protected by screwing protective caps onto them. Such caps may be either open sleeves or closed plugs. Protective caps may be screwed onto the pipes having threads on their outer surface (pivots). Similarly, protective caps may be used which have threads on their exterior surface which are screwed onto the inside threads (bushings) of a pipe.

Protection against chemical influences may be achieved by coating the threads with grease. In addition, there are now protective caps made of synthetic material; such caps often provide sufficient protection for threads.

There are many cases, however, where very high demands are made on the mechanical strength of a protective cap. For example, it is common to pull pipes, which are to be used in an oil drilling operation, into a drilling tower. During such an operation, the lower end of the pipe experiences considerable mechanical stress as a result of the fact that the end of the pipe is dragged on the ground.

Oil drilling operations require that once the pipe is moved into position, the device for protecting the threads must be removed in a very short time. For the steel protective caps now often used, removal is performed by unscrewing the cap. However, this process is time consuming.

In order to reduce the time that is necessary to remove such a steel protective cap, it is frequently loosened before the pipe is pulled onto the drilling tower. Such loosening, however, often causes the protective cap to become cross-threaded such that the thread is damaged by further forced loosening.

Other types of caps are available which are used especially for transporting a pipe onto a drilling tower. Such caps, however, have the disadvantage that they do not sufficiently protect the threads from dirt. Also, such caps often wear out quickly. Moreover, the installation of such a special cap requires time and consequently increases the labor costs of the drilling operation.

Use of steel caps is often undesirable, since they do not protect threads against stronger impacts. Rather, such impacts destroy both the cap and pipe. Furthermore, steel caps often become cross-threaded, and turning the cap then leads to the destruction of the thread. Moreover, steel caps cannot protect threads against the effects of water, moisture, sand, and dust. When pipes are stored for extended periods in the open, the threads thus are exposed to corrosion.

To avoid these disadvantages, pipe users occassionally use protective caps made of metal which are lined with an elastomeric material. The elastomeric material thus provides a better seal between the steel cap and the thread, as well as providing a cushion between the cap and the thread. This helps to protect against the effects of moisture as well as mechanical impact.

It is clear, however, that manufacturing protective caps with an inside lining of elastomeric material requires increased technical expertise as well as added expense. Moreover, such lined caps are ineffective to fully protect threads against moisture, water, and dust.

A type of protective cap currently available is made of synthetic material. Such synthetic caps may be produced with threads; after such caps have been placed on the threads of pipes, they may only be removed by the time-consuming process of unscrewing them. Some synthetic caps do not have threads; this type of construction is also undesirable, since such caps do not fit tightly on the pipes. Thus, the caps are subject to being pulled off inadvertently and do not provide good protection against the penetration of water and dirt.

In order to protect the outer and inner threads of pipes, protective caps, consisting of steel, plastic, or a combination of the materials, are often used. Even if such protective caps are screwed onto the threads and do provide some protection for the threads against damage, such devices provide no protection for the inside of a pipe. As a result, foreign substances, such as water, dirt, ice, and sand, become lodged in the interior of the pipe.

Pipes are often inserted into wells having depths as great as several thousand meters. Thus, a large number of pipes must be screwed together. The threads of the upper pipes must absorb the weight of the entire pipe line. Moreover, the screw connections between the pipes must often be gas-tight. Therefore, complicated thread designs are frequently used. It is clear that such threads must remain intact after their manufacture.

Pipes are also often connected by welding them together. The ends of such pipes are often provided with precise welding chamfers which, like the pipe threads, must be protected.

Pipes used in drilling operations frequently are transported or stored for extended periods. During such times, the pipes are exposed to weather and dirt. If left without protection, the pipe ends are in contact with foreign substances and often corrode, causing a lessening of the integrity of the pipe ends. When such pipes are then to be used, it is a time consuming and expensive task to sort out which pipes are usable.

SUMMARY OF THE INVENTION

In a principal aspect, the present invention is a method for protecting machine or pipe threads. The thread is first cleaned and then coated with a separating agent that will prevent the thread from adhering to a protective material. Next, a mold is loosely mounted around the thread. The mold and thread bear a spaced relationship to each other and thus provide an interspace between them. Finally, the interspace is filled with a protective material such as an elastomer.

In another primary aspect of the invention, a tear-open element is arranged in the interspace before it is filled with the protective material. Thus, after the mold is removed, the protective material may be quickly removed by pulling on the tear-open element.

In yet another primary aspect of the invention, a device for protecting threads is provided which includes a cap of molded, protective material. The cap also includes a tear-open element for easily removing the cap from the thread.

Thus, the present invention helps solve the problem of protecting devices which are to be connected with each other. The invention also protects the insides of such parts, such as pipe interiors. Such protection is most useful immediately after such devices have been manufactured. However, the method may be used independently of the manufacturing process. In addition, once the devices are to be used, the protective devices can be removed with little effort and in an extremely short time. The invention hermetically seals the devices against such elements as weather, dust, sand, and salt water.

A protective material may be in the mold as it is placed around the threads or it may be injected into the interspace after the mold has already been attached to the pipe. The protective material may have elastomeric properties. Polyurethane is particularly useful with the present invention.

By using a casted cap, the threads and sealing flanges are properly sealed; rain water, snow, ice, dust, and particularly salt water and humid air cannot penetrate the cap and cause corrosion. Thus, the time consuming task of cleaning and greasing the pipe ends so that they may be connected is eliminated. Moreover, the physical strength of the cap, particularly if the mold is left on with the casted protective material, provides protection against damage from impact.

The protective device can be made simply. Moreover, it may be quickly detached from the protected objects. This feature is particularly advantageous if it is undesirable to spend time unscrewing a protective cap in the conventional manner.

For instance, the protective caps used on pipes in earth drilling projects must be removed very fast. Labor costs in such projects are high and the unscrewing of conventional protective caps for a large number of pipes causes considerable expense. In order to avoid these disadvantages, the present invention allows quick separation of the protective cap from the pipe.

The protective device also may include a tearing lug, a tearing thread, or, generally, a predetermined breaking line so that the cap may be readily removed. The method has the additional advantage that it may be used everywhere; it is not limited to use at the factory that manufactures the pipe.

The protective cap includes weak spots, cutting surfaces, or other means which make it possible to remove the protective cap by tearing it. The protective cap may be made in a separate mold or be put onto the threads directly by extruding.

It is thus the object of the present invention to produce a covering that may be removed with little effort and within a very short time. In yet another primary aspect of the present invention, a stopper is made of elastic material and can be pressed into the pipe. The outside of the stopper bears against the inside surface of the pipe, hermetically sealing it.

For the protection of outside threads, the stopper can be made in the form of a cylinder with a closure on one end. The outer jacket of the cylinder has flexible sealing lips surrounding its periphery.

A stopper can also be made by pressing it directly into the pipe end. In one form of the present invention which protects inside threads, the stopper is disk-shaped and includes a production which surrounds the periphery of the stopper. The stopper is preferably somewhat conical in shape, pointing inward toward the rest of the pipe. In addition, a wide end of the stopper pointing out of the pipe can be provided with a conical projection which surrounds the entire periphery of the pipe.

It is an object of the present invention to provide a hermetical sealing against the interiors of pipes and of other cylindrical housings. The sealing lips on the preferred form of the closing stopper are usable with pipes having different inside diameters. Thus, the production of such stoppers may be limited to a few sizes, each size having the ability to protect many different size diameter pipes. The outer edge of the stopper provides sufficient sealing for the front side of the pipe.

The disk-like stopper, which protects the insides of pipes and other such devices, has a shoulder which extends beyond the end of a protector sleeve made of steel. The conical narrowing of this shoulder facilitates the mounting of the stopper inside the pipe. The conical widening provided on the disk-shaped stopper assures that the stopper will properly seal the inside of the pipe.

The stoppers can be mounted easily because they can be pushed in by hand into the end of a pipe or into the sleeve of a protective device. As a result, the stoppers are protected against displacement. Unlike conventional protectors, this keeps the present stoppers from being lost while the pipes are being transported over great distances. Yet another object of the present invention is to provide a simple, yet highly reliable, system for sealing the interiors of cylindrical pipes or housings.

BRIEF DESCRIPTION OF THE DRAWING

A preferred embodiment of the present invention is described herein with reference to the drawing wherein:

FIG. 1 is a side view of a preferred embodiment of the present invention showing a pipe end with threads in a casting mold;

FIG. 2 is a side view of the preferred embodiment of FIG. 1 showing the casting mold in use and the interspace filled;

FIG. 3 is a side view of a variation of the preferred form of the present invention shown in FIG. 1 showing a shaft with an inside thread and a mold core;

FIG. 4 is a side view of the shaft shown in FIG. 3 with the interspace filled;

FIG. 4a is a side view of a variation of the preferred form of the invention shown in FIG. 1 with a mold core and a pipe end with inside threads;

FIG. 17 is a side view of a pipe end having a protective cap screwed on;

FIG. 18 is a side view of a closing stopper;

FIG. 19 is a cross-sectional view of a pipe end with a protective cap screwed on and a closing stopper inserted;

FIG. 20 is a cross-sectional view of a pipe end showing a closing stopper inserted and wherein the outer end of the stopper surrounds the collar-like pipe ends and welding chamfer;

FIG. 21 is a cross-sectional view of a pipe end having an outer thread which is protected by a closing stopper with a collar-like formation at its outer end;

DETAILED DESCRIPTION OF THE PREFERRED EMBODIMENT

Figure 5:
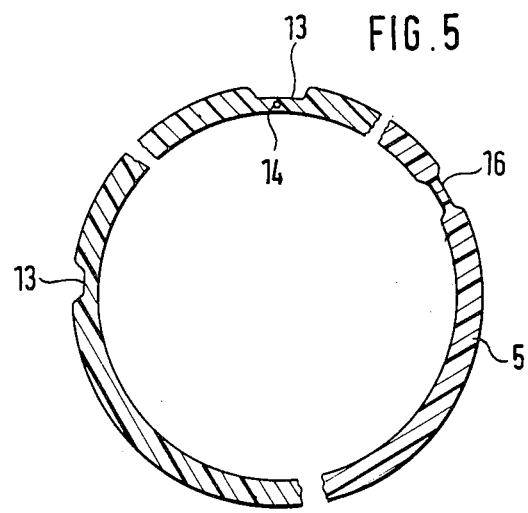
FIG. 5 is a cross-sectional view of the protective cap shown in FIG. 1 with different types of weakened areas shown.

As shown in FIG. 1, a pipe 1 has an end thread 2 which is to be protected against corrosion and mechanical damage. A mold 3, which can be slid over the thread 2, provides the protection. In the upper zone, the mold 3 is equipped with a filling projection 4; this filling projection allows material to be inserted and form the protective device.

FIG. 2 shows the use of the mold 3. The material is applied in the direction of the arrow 6 into the space formed between the thread and the inside surface of the mold 3. After a short hardening time, the resulting device 5 hermetically seals the thread 2 and protects it from mechanical damage. As illustrated in FIGS. 1 and 2, the connecting end piece of the thread of pipe 1 curves, as a practical matter, as the mold core during the formation of the protective device.

According to FIG. 3, an end piece 8 rests on a shaft 7. The shaft 7, which can be replaced by pipe, includes a hollow space 9 and an inside thread 10. The mold 11, which acts as a core in this example, slides into the hollow space 9. Thus, as shown in FIG. 4, the interspace between the mold 11 and the shaft 7 can be filled through the filling opening 11a with the material forming the protective device 12.

According to another example of the preferred embodiment shown in FIG. 4a, the end of the pipe 1 has an inner thread 21 provided with a protective covering 24. The mold 22 is made with a ring-shaped thickening 23 that seals against the pipe 1. The material inserted through the openings 22a thus cannot pass beyond thickening 23 and into the interior of the pipe.

FIG. 5 shows a sleevelike protective device 5 with several different, weakened cross-sectional areas. According to one aspect of the preferred embodiment, a simple weakened cross-sectional area 13 exists on the protective device 5. Because of its slight thickness, the protective device can be opened with a simple, common cutting tool. As shown in FIG. 5, for example, the weak portion of the elastomeric material defines at least one imaginary plane that intersects the pipe.

Figure 6:
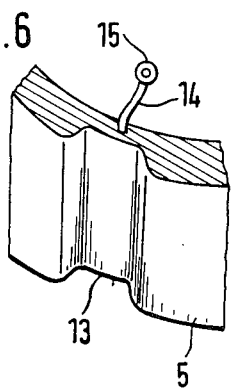
FIG. 6 is a graphical illustration of the protective cap shown in FIG. 5 with an inserted tearing line.

The insertion of a tearing wire 14 allows the protective device 5 to be opened without any other tools. According to FIG. 6, the end of the wire 14 is equipped with a ring 15 for a better grip. A double-side weakening 16 can also be provided in the protective device 5 if a corresponding core is put in.

Figure 7:
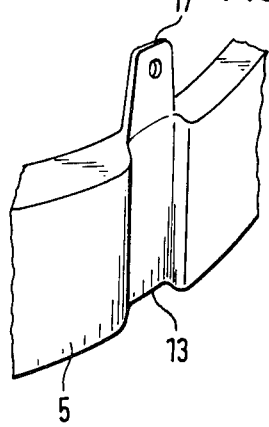
FIG. 7 is a graphical illustration of a narrow cross-sectional area that may be used with the protective cap shown in FIG. 1.

FIG. 7 shows another aspect of the preferred embodiment that uses a tearing lug 17. By pulling the tearing lug 17, the protective device can also be opened without the help of outside tools.

Figure 8:
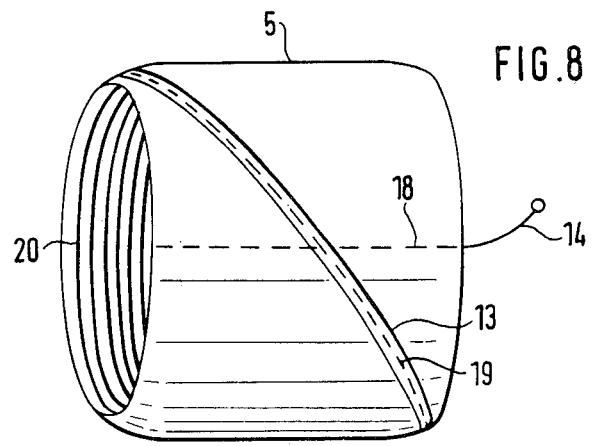
FIG. 8 is a graphical illustration of the protective cap shown in FIG. 1 with markings showing the course of a tearing line.

The example according to FIG. 8 shows the straight course of the tear-off line 18 and inserted tearing wire 14'. Another possibility for enabling the protective device to be quickly torn open is shown by a spiral arrangement of a tearing line within a weakening of the cross-sectional area 13.

From the illustration according to FIG. 8, it can be seen clearly that when making the protective device by casting it, thread turns are formed on the protective device. Such thread turns are a mirror image, or negative, of the turns actually found on the pipe.

By means of the example shown, it can be recognized easily that, if sufficient time for the unscrewing of the connecting device is not available, it is possible to remove the protective device by a tearing element along a defined line. Thus, considerable expense may be saved.

For the production of the protective device, the hollow, or outer, end of the parts to be protected (thread turns and seals) are cleaned and coated with a separating agent. The mold may consist of two parts which are connected to each other by a hinge. Alternatively, the mold may be made of one part which can be put around the end to be protected or be slid into the hollow space to be protected.

The mold can also be provided with a separating agent in order to ease the removal of the mold after it has been filled with the elastomeric material. The material forming the device, such as, for example, elastomeric material, is subsequently put into the interspace between the mold and the part to be protected. The filling can effectively take place without applying pressure to the material.

After a period of about five minutes, the material will have hardened sufficiently, and the mold can be pulled off and used again on the next part to be protected. The mold can also be left on the part to be protected for increased protection. In such a case, where the mold acts shell on the object to be protected, the use of a separating medium on the mold can be omitted.

Figure 9:
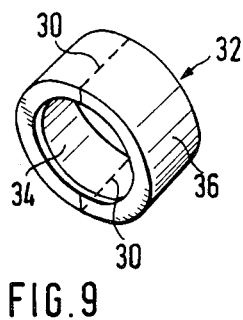
FIG. 9 is a perspective view of a variation of the preferred form of the embodiment of FIG. 1 with a common type of thread covering for a sleeve.

The broken lines shown in FIG. 9 indicate two possible weak spots 30 provided on the periphery. These weak spots 30 divide the sleeve 32 into halves 34, 36.

Figure 10:
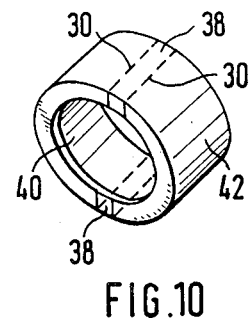
FIG. 10 is a perspective view of the thread covering shown in FIG. 9 with four weak spots arranged on its periphery.

By the arrangement according to FIG. 10, it is possible to separate the two center strips 38. This facilitates the removal of the remaining halves 40, 42 or of an enclosed protective device.

Figure 11:
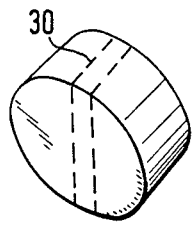
FIG. 11 is a perspective view of a preferred form of the present invention showing a covering for the threads in a closed type of protective cap.

The broken lines in FIG. 11 signify two continuous weak spots.

Figure 12:
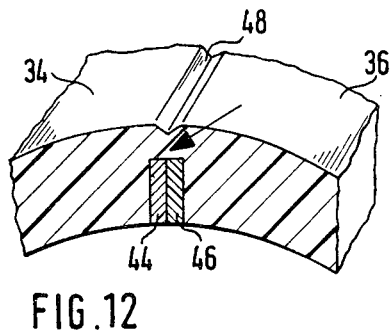
FIG. 12 is a cross-sectional view of a weak spot shown in FIG. 10.

FIG. 12 shows a weak spot which is formed by strips of material 44, 46. The cross-sectional area over the strip (arrow) may be severed, for example, by cutting it with a knife from the outside or by pulling a wire inserted between the strips. The halves 34, 36 can then be removed. The illustration of FIG. 12 also shows a groove 48.

Figure 13:
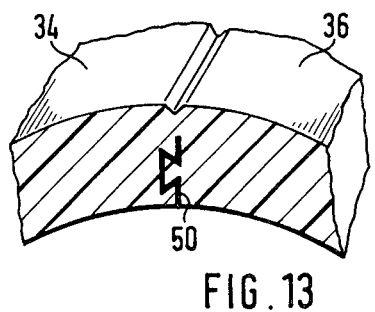
FIG. 13 is a cross-sectional view of a variation of a weak spot shown in FIG. 12.

FIG. 13 shows a weak spot which is formed by the strip 50. Because of its profile, the strip 50 has a dovetailed shape. This area of separation guarantees that even after the destruction of the cross-sectional area above the strip, the halves 34, 36 remain next to the threads until they can be pulled off.

Figure 14:
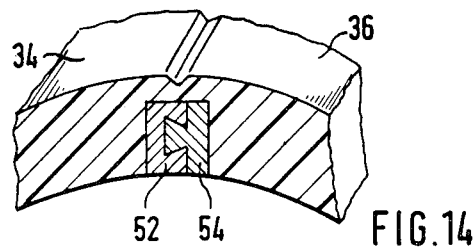
FIG. 14 is a cross-sectional view of a variation of a weak spot shown in FIG. 12.

FIG. 14 shows a weak spot that is formed by the strips 52, 54. The strips 52, 54 also have a "dovetail profile" and the same purpose as explained in the description pertaining to FIG. 13.

Figure 15:
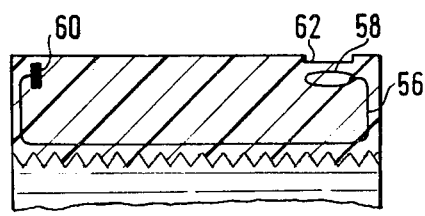
FIG. 15 is a cross-sectional view of a variation of the preferred form of the present invention shown in FIG. 1 with the protective device having an inserted wire.

FIG. 15 shows a longitudinal, cross-sectional view of a sleeve. A wire 56 is inserted in the protective device. One end of the wire 56 includes an indicator, variously referred to as a "lug" or an "ear" 58, and the other end includes an anchor 60. The anchor 60 is embedded away from the cutting surface into one of the halves 34, 36. In addition, a recess 62 is shown over the ear 58. Thus, the recess 66 visually indicates, or marks, the location of the lug or ear 58. The recess 66 may thus be referred to as marking means.

Figure 16:
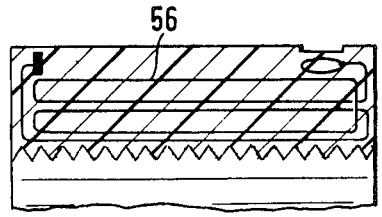
FIG. 16 is cross-sectional view of a sleeve showing a preferred form of the present invention.

FIG. 16, like FIG. 15, shows a longitudinal cross-sectional view of a sleeve. However, a wire 56' is bent into loops.

Reference is made now to FIGS. 17-23. A protective device 73 for threads consists of a steel sleeve 74 with a lining 75 of elastomeric material. The protective device 73 is screwed onto the end of a pipe 71 having an outer thread 72. On the front side of the steel sleeve there are pivots 76. A tool can attach onto the pivots in order to transfer torque to the sleeve and screw it onto the pipe. A cylindrical closing stopper 77 has an inner end with a bottom 78. The closing stopper slides into the pipe 71.

The outer periphery of the closing stopper 77 is provided with sealing lips 79. When pressing the closing stopper into the pipe 71, the sealing lips are bent over to the extent required by the diameter of the pipe. Thus, different sizes of pipe diameters may be blocked with the same closing stopper. Simultaneously, the frictional force to be overcome during the pressing in of the stopper is kept low. Hermetic sealing against the penetration of such elements as moisture, aggressive gases, and dust can be achieved by the arrangement of several lips as shown in FIGS. 17 to 19.

According to other aspects of the present invention shown in FIGS. 20 and 21, the closing stopper has a collar 85 or a collar 86. These collars surround the pipe ends and thereby protect the outside threads or welding chamfers 87.

In order to protect the inside threads on pipe ends, one may alternatively use a steel sleeve 80. The steel sleeve 80 presses an elastomeric material 81 into the individual thread turns (FIG. 22).

Figure 22:
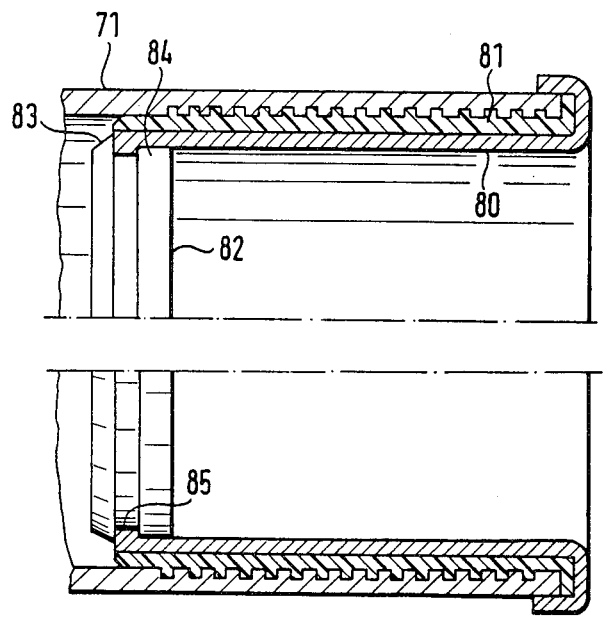
FIG. 22 is a cross-sectional view of a pipe end having an inside thread, a device for protecting threads screwed on, and a closing stopper inserted.
Figure 23:
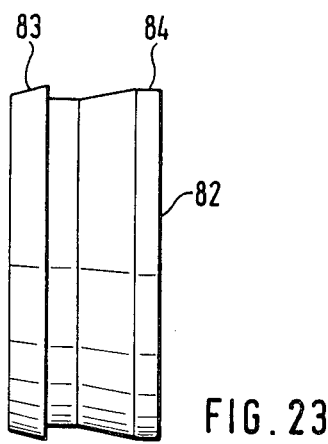
FIG. 23 is a side view of an individual stopper.

The inner, open end of the steel sleeve 80 is closed by a disk-shaped stopper 82 (FIGS. 22 and 23). The end of the stopper that would normally point inward toward the pipe includes a projection 83 that narrows conically in the direction of the pipe. The end of the closing stopper that points outward, away from the pipe, is also made with a conical projection 84 that is capable of yielding when the closing stopper is pressed into the sleeve 80. Thus, the entire inside cross-sectional area of the sleeve is sealed.

The projection 83 points inward and attaches onto the end of the sleeve 80, behind the innermost edge. Thus, it keeps the closing stopper from being pulled out.

In the lower half of FIG. 22, the sleeve 80 is shown with a collar 85 that reaches radially inward into the interspace between the projections 83, 84. Thus, the sealing effect is enhanced. The conical slanting of the projections facilitates pressing the stopper into the steel sleeve of the protective device. By means of these simple embodiments, the pipes can be exposed to weather for a long period without the danger of a corrosion of either the threads or interiors of the pipes.

What is claimed is:

1. A guard for protecting threads on an end of a pipe comprising, in combination:
    a base of elastomeric material about said threads;
    tear-off means for facilitating removal of said base, said tear-off means including a wire embedded in said elastomeric material, said wire including a tear-off lug embedded in a predetermined location within said elastomeric material of said base; and
    marking means, on said base, for indicating said predetermined location of said tear-off lug.

2. A guard for protecting threads as claimed in claim 1 wherein said pipe defines an exterior surface and said threads run on said exterior surface of said end of said pipe and wherein said base comprises a cap adjacent said threads on said exterior surface of said pipe.

3. A guard for protecting threads as claimed in claim 2 wherein said marking means comprises a recess on said exterior surface of said base.

4. A guard for protecting threads as claimed in claim 1 wherein said marking means comprises a recess on said base.

5. A guard for protecting threads as claimed in claim 1 wherein said threads define a corrugated surface and said base is comprised of a hardened foam, said hardened foam including threads for engaging said threads of said pipe, whereby said hardened foam is in intimate contact with said corrugated surface of said threads.

6. A guard for protecting threads as claimed in claim 1 wherein said base defines an exterior surface and said marking means is on said exterior surface of said base.

7. A guard for protecting threads as claimed in claim 1 wherein said elastomeric material is made of polyurethane.

8. A guard for protecting threads as claimed in claim 1 wherein said wire is metallic.

9. A guard for protecting threads as claimed in claim 1 wherein said wire forms at least one loop, whereby the power necessary to pull said wire and remove said guard is reduced.

10. A guard for protecting threads as claimed in claim 1 wherein said tear-off lug defines an aperture for receiving a hook.

11. A guard for protecting threads as claimed in claim 1 wherein said wire includes an end interconnected with an anchor in said elastomeric material, whereby said wire may be pulled to cause said elastomeric material to be cut and said guard to be removed from said pipe.

* * * * *